(12) United States Patent
Yasui

(10) Patent No.: US 8,855,464 B2
(45) Date of Patent: Oct. 7, 2014

(54) VIDEO REPRODUCTIONS APPARATUS AND VIDEO REPRODUCTION METHOD

(75) Inventor: Yoshiki Yasui, Iruma (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 350 days.

(21) Appl. No.: 13/162,267

(22) Filed: Jun. 16, 2011

(65) Prior Publication Data

US 2012/0027375 A1 Feb. 2, 2012

(30) Foreign Application Priority Data

Jul. 30, 2010 (JP) ................................. 2010-172749

(51) Int. Cl.
*H04N 5/775* (2006.01)
*H04N 13/04* (2006.01)

(52) U.S. Cl.
CPC ....... *H04N 13/0438* (2013.01); *H04N 13/0497* (2013.01); *H04N 2213/008* (2013.01)
USPC ........................................................ 386/230

(58) Field of Classification Search
CPC ....... H04N 5/775; H04N 5/85; H04N 9/8042; G11B 27/34; G11B 27/105
See application file for complete search history.

(56) References Cited

U.S. PATENT DOCUMENTS

| | | | |
|---|---|---|---|
| 2007/0232255 A1 | 10/2007 | Masuda | |
| 2010/0094779 A1 | 4/2010 | Ohbitsu | |
| 2011/0234586 A1 | 9/2011 | Aoki | |
| 2011/0249102 A1* | 10/2011 | MacNaughton et al. | 348/56 |

FOREIGN PATENT DOCUMENTS

| | | |
|---|---|---|
| EP | 2187650 | 5/2010 |
| EP | 2326099 | 5/2011 |
| JP | 11-098537 | 4/1999 |
| JP | 2000-004453 | 1/2000 |
| JP | 2003-087367 | 3/2003 |
| JP | 2003-338096 | 11/2003 |
| JP | 2005-086498 | 3/2005 |
| JP | 2007-266954 | 10/2007 |
| JP | 2008-306426 | 12/2008 |
| JP | 2010-093721 | 4/2010 |
| JP | 2010-124466 | 6/2010 |
| WO | WO 2011122290 | 10/2011 |

OTHER PUBLICATIONS

Japanese Patent Application No. 2010-172749, Notification of Reasons for Refusal, mailed Feb. 6, 2012, (with English Translation).
Extended European Search Report Dated Feb. 3, 2012, European Application No. 11170564.6-2202.

* cited by examiner

*Primary Examiner* — William C Vaughn, Jr.
*Assistant Examiner* — Daniel Tekle
(74) *Attorney, Agent, or Firm* — Blakely, Sokoloff, Taylor & Zafman LLP

(57) ABSTRACT

According to one embodiment, a video reproduction apparatus includes a processor and a controller. The processor is configured to perform signal processing on a video signal including a plurality of videos, The controller is configured to determine that a battery usable time of glasses for viewing the plurality of videos is shorter than a reproduction time of a content corresponding to the video signal, and to stop output of a video signal on which the signal processing has been performed by the processor and to display a warning message for replacement or charging of a battery of the glasses when determines that the battery usage time of the glasses is shorter than the reproduction time of the content corresponding to the video signal.

4 Claims, 8 Drawing Sheets

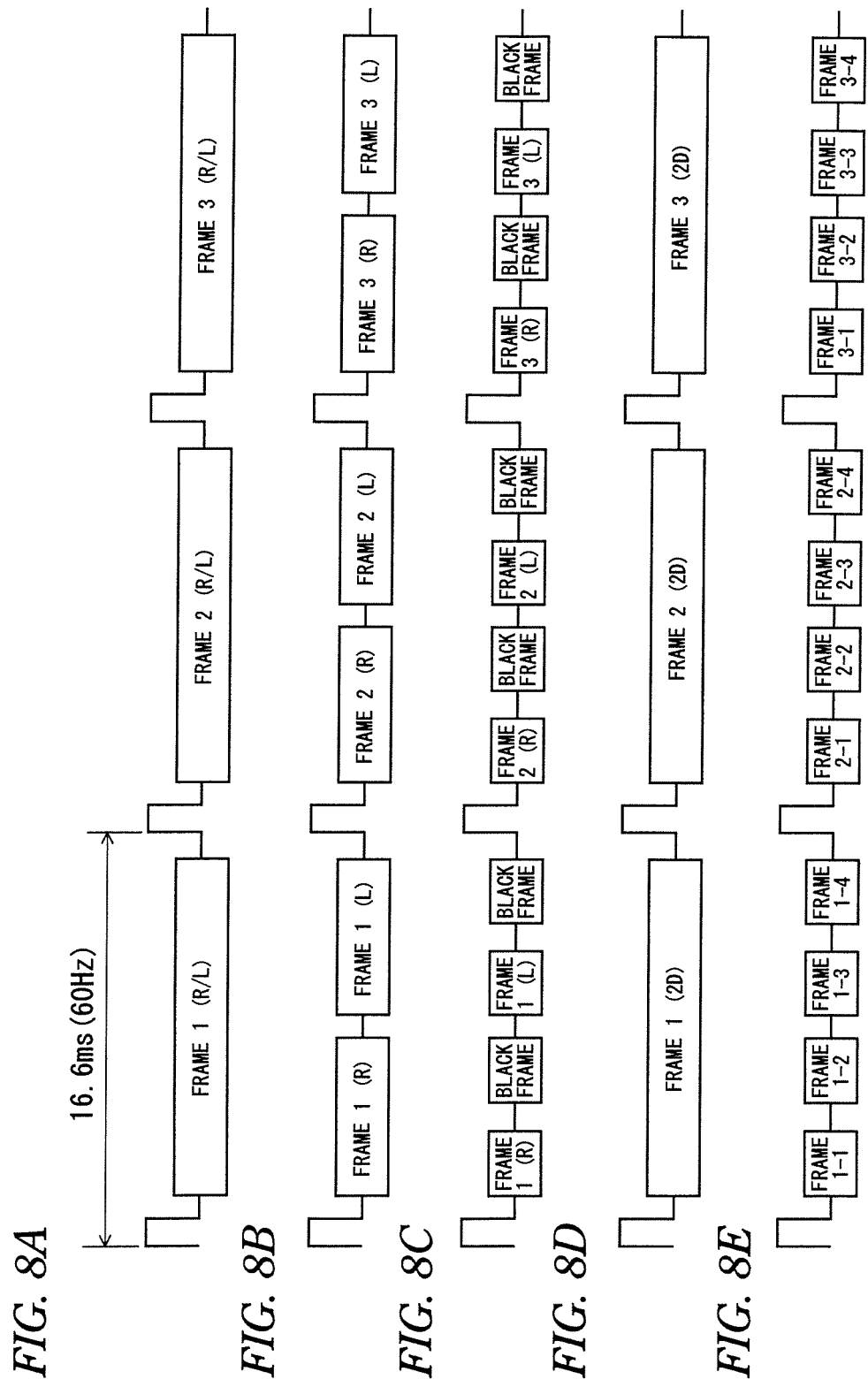

VIDEO REPRODUCTIONS APPARATUS AND VIDEO REPRODUCTION METHOD

CROSS REFERENCE TO RELATED APPLICATION(S)

This application is based upon and claims the benefit of priority from Japanese Patent Application No. 2010-172749 filed on Jul. 30, 2010, the entire contents of which are incorporated herein by reference.

FIELD

Embodiments described herein relate generally to a video reproduction apparatus and a video reproduction method which control reproduction of 3D video.

BACKGROUND

Techniques for allowing a user to recognize 3D video using a flat video display screen are now being developed. In these techniques, 3D vision is realized by preparing two kinds of video having a parallax corresponding to the interval between human eyes and causing the right eye and the left eye of a user to see right-eye video and left-eye video, respectively.

More specifically, right-eye video and left-eye video are displayed alternately on the video display screen. The left-eye shutter of 3D glasses worn by a user is controlled so that their left-eye shutter is closed when the right-eye video is displayed and their right-eye shutter is closed when the left-eye video is displayed. The user is thus allowed to recognize the 3D video.

Those 3D video reproduction techniques have now reached to as high a level as can be put into practical use. Therefore, from this time onward, it is important to develop not only techniques for allowing a user to feel 3D video closer to a reality but also techniques for accelerating putting into practical use of the 3D video reproduction techniques by allowing users to use them more conveniently.

BRIEF DESCRIPTION OF THE SEVERAL VIEWS OF THE DRAWINGS

A general configuration that implements the various features of the invention will be described with reference to the drawings. The drawings and the associated descriptions are provided to illustrate embodiments of the invention and not to limit the scope of the invention.

FIGS. 8A to 8E are exemplary views explaining detailed processes of a 3D video signal in the video output module.

DETAILED DESCRIPTION

In general, according to one embodiment, a video reproduction apparatus includes a processor and a controller. The processor is configured to perform signal processing on a video signal including a plurality of videos, The controller is configured to determine that a battery usable time of glasses for viewing the plurality of videos is shorter than a reproduction time of a content corresponding to the video signal, and to stop output of a video signal on which the signal processing has been performed by the processor and to display a warning message for replacement or charging of a battery of the glasses when determines that the battery usage time of the glasses is shorter than the reproduction time of the content corresponding to the video signal.

Exemplary Embodiments will be hereinafter described.

First Embodiment

A first embodiment will be described below with reference to FIGS. 1-6.

The first embodiment assumes a system for presenting 3D video using 3D glasses. The 3D glasses make it possible to present right-eye video and left-eye video to the right eye and the left eye, respectively, by controlling liquid crystal shutters. The embodiment also assumes that the 3D glasses employ a battery (may be either a primary battery or a secondary battery) for driving them, and that the 3D glasses are equipped with a module capable of detection (called charge detection) of a battery status (such information as a voltage or a capacity) and informing the system of it.

Figure 1:
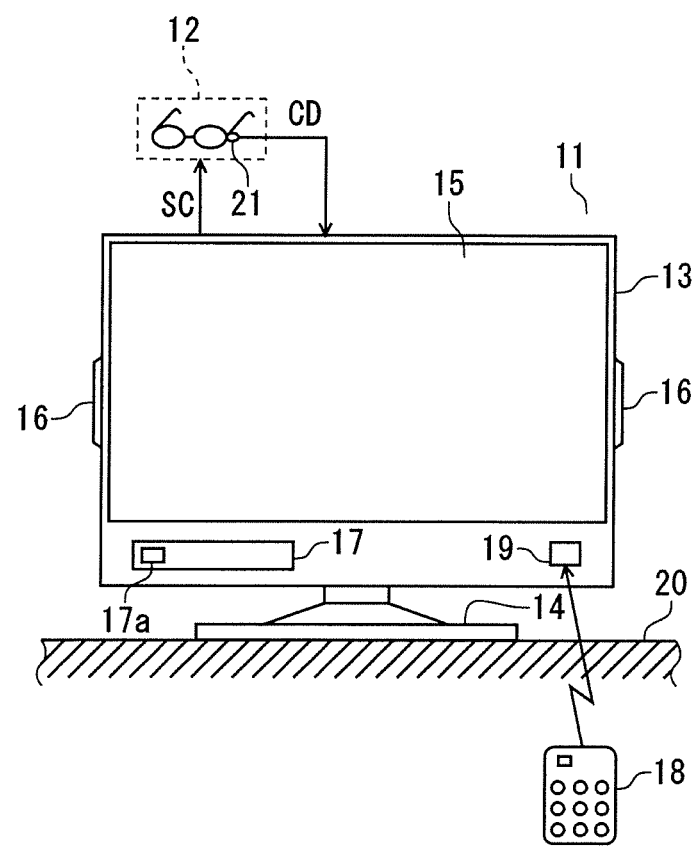
FIG. 1 is an exemplary schematic view explaining a 3D video reproduction system according to an embodiment.

FIG. 1 outlines a 3D video reproduction system according to the embodiment, which is provided with a digital TV broadcast receiver 11 as a 3D video reproduction apparatus and 3D glasses 12 for allowing a user to recognize 3D video when seeing video displayed on the digital TV broadcast receiver 11.

The digital TV broadcast receiver 11 has a thin case 13 and a support stand 14 which supports the case 13. A liquid crystal panel 15 as a video display device is incorporated in the case 13 so as to occupy its front, major portion. Both side walls of the case 13 are provided with speakers 16 to enable reproduction of a stereo sound.

A bottom-front portion of the case 13 is provided with an operation device 17 including a main power switch 17a and a light-receiving device 19 for receiving operation information that is transmitted form a remote controller 18. The support stand 14 is connected rotatably to a central portion of the bottom wall of the case 13 and is configured so as to support the case 13 erected in a state that the support stand 14 is placed on the horizontal surface of a prescribed base stage 20.

When receiving a 3D broadcast video signal, the digital TV broadcast receiver 11 generates a right-eye video signal and a left-eye video signal on the basis of the received video signal and displays right-eye video and left-eye video alternately on the liquid crystal display panel 15.

The digital TV broadcast receiver 11 generates a shutter control signal SC indicating right-eye video display periods and left-eye video display periods and outputs it to the 3D glasses 12.

The 3D glasses 12 are controlled on the basis of the shutter control signal SC transmitted from the digital TV broadcast receiver 11 so as to close the left-eye shutter when right-eye video is displayed and to close the right-eye shutter when left-eye video is displayed, and thereby allow the user to recognize 3D video.

The 3D glasses 12 are equipped with a battery energy detecting module 21 for detecting whether the battery is dead or not, that is, for detecting remaining battery energy. A battery energy detection signal (charge detection signal) CD is output from the battery energy detecting module 21 and supplied to the digital TV broadcast receiver 11.

If the battery energy detection signal CD indicates that the battery is normal, the digital TV broadcast receiver 11 performs 3D video display, that is, displays right-eye video and left-eye video alternately on the liquid crystal display panel 15.

If the battery energy detection signal CD indicates that the battery is not normal, the digital TV broadcast receiver 11 performs, for example, an operation of converting a received 3D video signal into an ordinary 2D video signal and displaying video on the liquid crystal display panel 15 on the basis of the generated 2D video signal.

Figure 2:
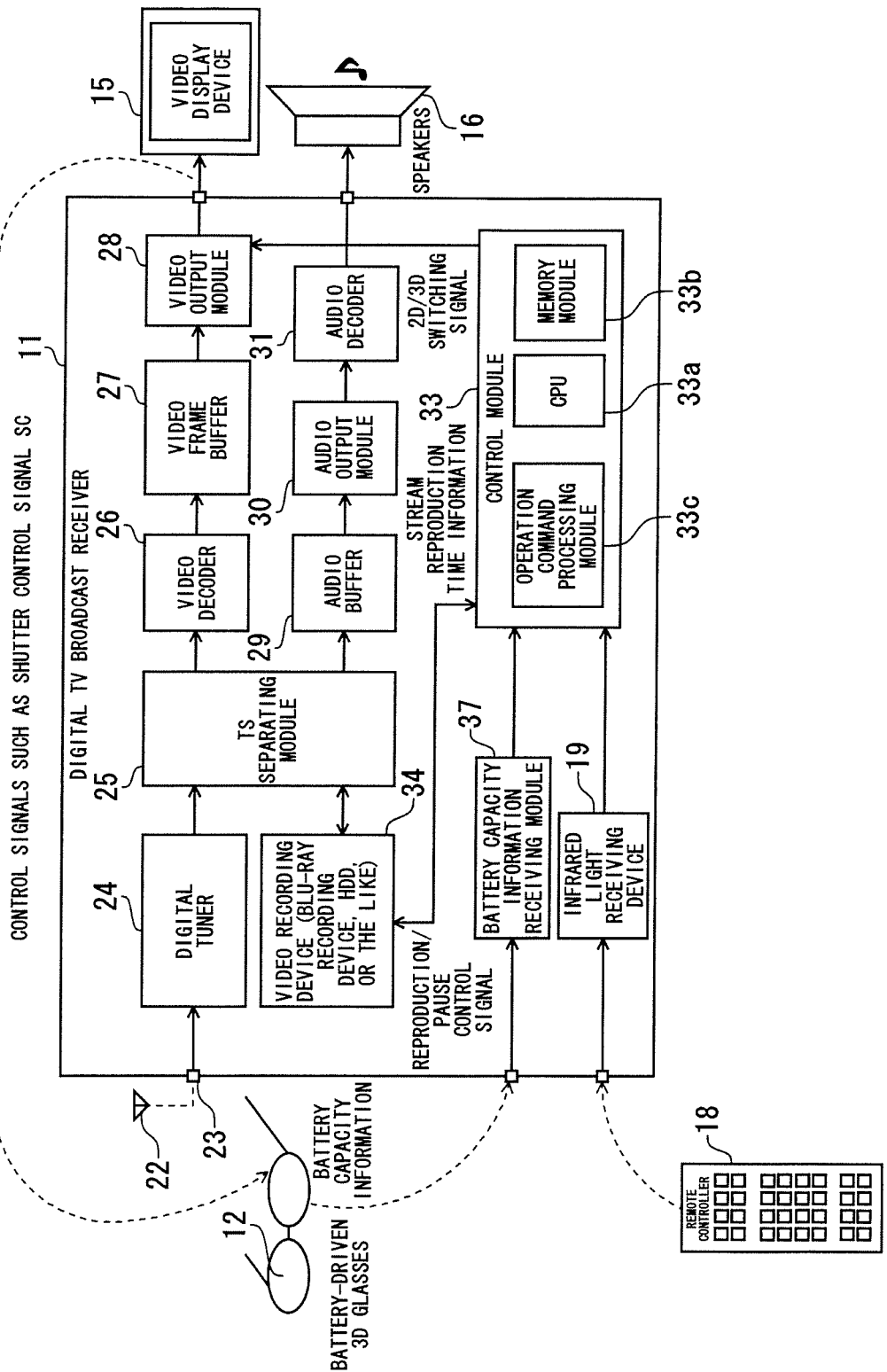
FIG. 2 is an exemplary block diagram explaining a signal processing system of a digital broadcast receiver which constitutes the 3D video reproduction system according to the embodiment.

FIG. 2 is a block diagram showing an essential configuration of the 3D video reproduction system according to the embodiment. The upper half of the block of the digital TV broadcast receiver 11 corresponds to a general digital TV broadcast receiver. The digital TV broadcast receiver 11 has a function of receiving a 3D video content in the form of digital broadcast waves or from a video recording device 34 such as an HDD or a Blu-ray® recording device and displaying the received 3D video on the video display device (liquid crystal display panel 15). To this end, the digital TV broadcast receiver 11 generates a R/L switching sync signal (shutter control signal SC) for operation of the 3D glasses 12.

The 3D glasses 12 have a function of sending information indicating a status of the battery incorporated in the 3D glasses 12 to the digital TV broadcast receiver 11 by a wired or wireless communication or by some other method. A control module 33 can supply the video recording device 34 with a control signal relating to reproduction, pause, or the like of the video recording device 34, and the video recording device 34 can supply the control module 33 with a signal indicating a reproduction time of a video content being reproduced.

The control module 33 outputs a 2D/3D switching signal to a video output module 28, and the video output module 28 has a function of selecting a 2D output signal or a 3D output signal.

FIG. 2 outlines a signal processing system of the digital TV broadcast receiver 11. Digital TV broadcast signals received by an antenna 22 is supplied to a tuning/demodulating module (digital tuner) 24 via an input terminal 23. The tuning/demodulating module 24 tunes into a signal on a desired channel from the received digital broadcast signals and demodulates the thus-selected broadcast signal into a transport stream (TS).

The transport stream that is output from the tuning/demodulating module 24 is supplied to a TS separating module 25, where it is separated into a video component and an audio component. The video component is decoded by a video decoder 26 into a digital video signal of an original form, which is stored in a video frame buffer 27. The video signal stored in the video frame buffer 27 is read into the video output module 28 on a frame-by-frame basis, subjected to prescribed signal processing (described later) therein, and supplied to the liquid crystal display panel 15 (video display device). Video is thus displayed on the liquid crystal display panel 15.

The audio component separated by the TS separating module 25 is temporarily stored in an audio buffer 29 and read from the audio buffer 29 into an audio output module 30, where it is subjected to prescribed signal processing. An audio signal that is output from the audio output module 30 is decoded by an audio decoder 31 into digital audio data of an original form, which is converted into analog signals. A sound is thus reproduced by the speakers 16.

The digital TV broadcast receiver 11 is provided with the video recording device 34, which may be an external recording/reproduction apparatus such as an optical disc recording/reproduction apparatus which performs recording and reproduction on an optical disc such as a DVD (digital versatile disc) or an external HDD (hard disk drive). A transport stream that is output from the video recording device 34 is supplied to the TS separating module 25. The TS separating module 25 selects one of a transport stream that is supplied from the tuning/demodulating module 24 and a transport stream that is supplied from the video recording device 34, and separates it into a video component and an audio component.

In the digital TV broadcast receiver 11, the control module 33 supervises various operations including the above-described various receiving operations. The control module 33 incorporates a CPU (central processing unit) 33a. When a operation command processing module 33c receives operation information from the operation device 17 or receives operation information that is transmitted from the remote controller 18 and received by the light-receiving device 19, the control module 33 controls related components so that they operate so as to reflect the content of the operation.

In doing so, the control module 33 uses a memory module 33b. The memory module 33b has a ROM (read-only memory; main memory) which is stored with control programs to be run by the CPU 33a, a RAM (random access memory) for providing a work area for the CPU 33a, and a nonvolatile memory for storing various kinds of setting information, control information, etc.

If a video signal that is supplied from the video frame buffer 27 on a frame-by-frame basis is an ordinary 2D video signal, the video output module 28 performs frame rate doubling conversion on the received 2D video signal to enable display on the liquid crystal display panel 15 and supplies a resulting video signal to the liquid crystal display panel 15. Two-dimensional video is thus displayed on the liquid crystal display panel 15.

If a video signal that is supplied from the video frame buffer 27 on a frame-by-frame basis is a 3D video signal, the video output module 28 generates a right-eye video signal and a left-eye video signal on the basis of the received video signal and outputs them alternately to the liquid crystal display panel 15. Three-dimensional video is thus displayed on the liquid crystal display panel 15.

In doing so, the video output module 28 also generates a shutter control signal SC which indicates right-eye video display periods and left-eye video display periods and outputs it to the 3D glasses 12 via an output terminal.

As a result, the 3D glasses 12 are controlled by the shutter control signal SC supplied from the digital TV broadcast receiver 11 so that the left-eye shutter is closed when the right-eye video is displayed and the right-eye shutter is closed when the left-eye video is displayed. The user can thus recognize 3D video.

The control module 33 can easily determine whether a video signal that is supplied from the video frame buffer 27 on a frame-by-frame basis is an ordinary 2D video signal or a 3D video signal by, for example, detecting attribute information that is added to the video signal.

As mentioned above, the 3D glasses 12 are equipped with the battery energy detecting module 21 for detecting remaining battery energy. The battery energy detecting module 21 sends, by radio, a battery energy detection signal CD, which is received by the battery capacity information receiving module 37. If remaining battery energy indicated by the battery energy detection signal CD received by the battery capacity information receiving module 37 is normal, the control module 33 causes the video output module 28 to generate a right-eye video signal and a left-eye video signal on the basis of the received video signal so that they are displayed alternately on the liquid crystal display panel 15 as 3D video.

If remaining battery energy indicated by the battery energy detection signal CD is not normal, the video output module 28 converts the received video signal into an ordinary 2D video signal, performs frame rate doubling conversion on the ordinary 2D video signal to enable display on the liquid crystal display panel 15, and supplies a resulting video signal to the liquid crystal display panel 15. Two-dimensional video is thus displayed on the liquid crystal display panel 15.

Figure 3:
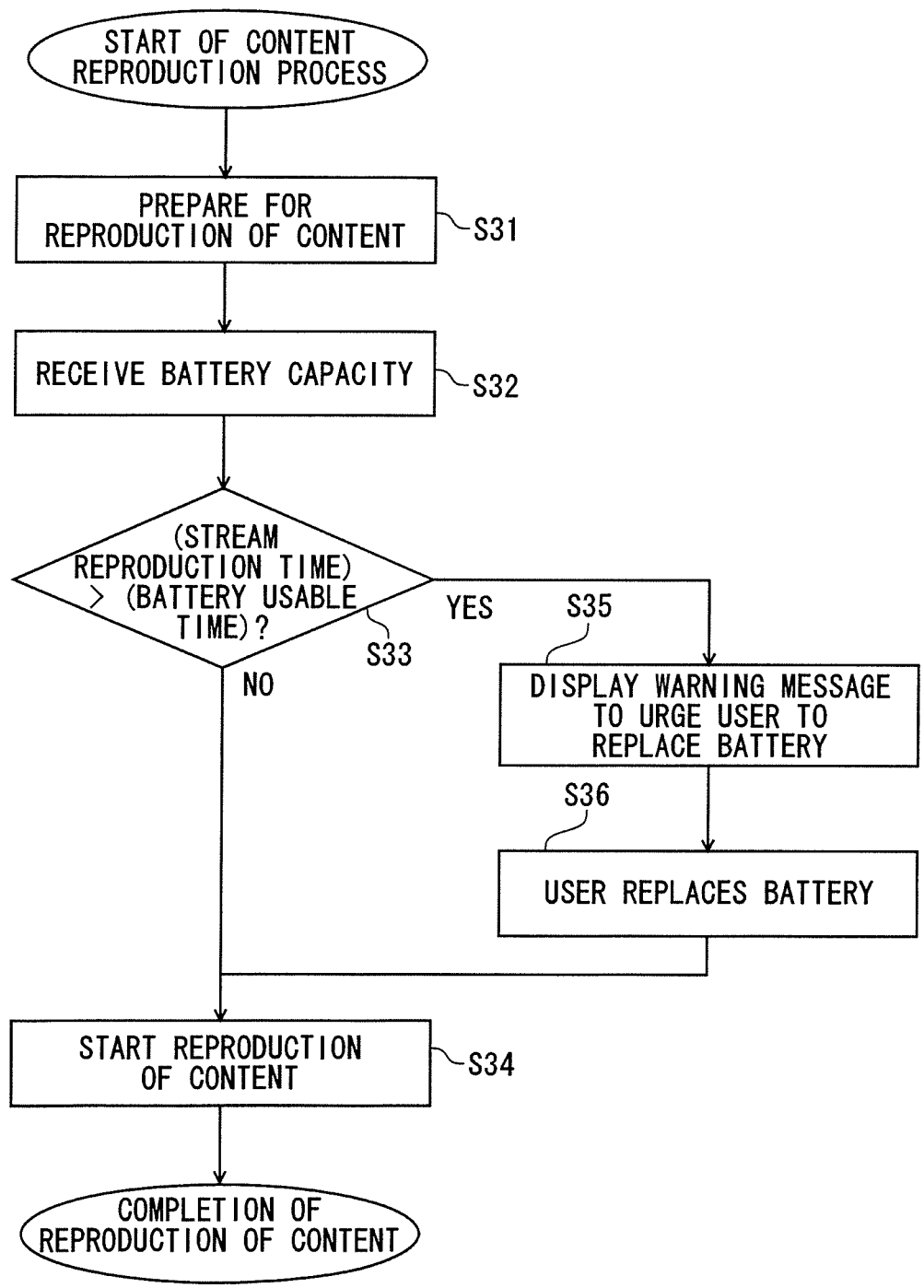
FIG. 3 is an exemplary flowchart showing a process of detecting a battery capacity according to the embodiment.

FIG. 3 is a flowchart of a process in which a battery capacity of the 3D glasses 12 is checked before reproduction of a recorded video stream. First, at step S31, the 3D video reproduction system prepares for reproduction of a content. At this step, a stream reproduction time of the content to be reproduced is received. At step S32, a current battery usable time is received by receiving a battery status from the 3D glasses 12. At step S33, the battery usable time is compared with the reproduction time of the content to be reproduced. If the battery usable time is not shorter than the reproduction time, at step S34 the video stream is reproduced ordinarily. On the other hand, if the battery usable time is shorter than the reproduction time, since it is highly probable that the battery of the 3D glasses 12 will run down during reproduction of the video stream, at step S35 a warning message is displayed on the screen to urge the user of the 3D video reproduction system to replace or charge the battery. In response, at step S36, the user replaces or charges the battery of the 3D glasses 12. If the user confirms replacement or charging of the battery or attachment of a new battery or the recharged battery is detected automatically, at step S34 reproduction of the video stream is started. In the following descriptions to be made with reference to flowcharts, steps having the same steps in FIG. 3 may not be described in detail.

Figure 4:
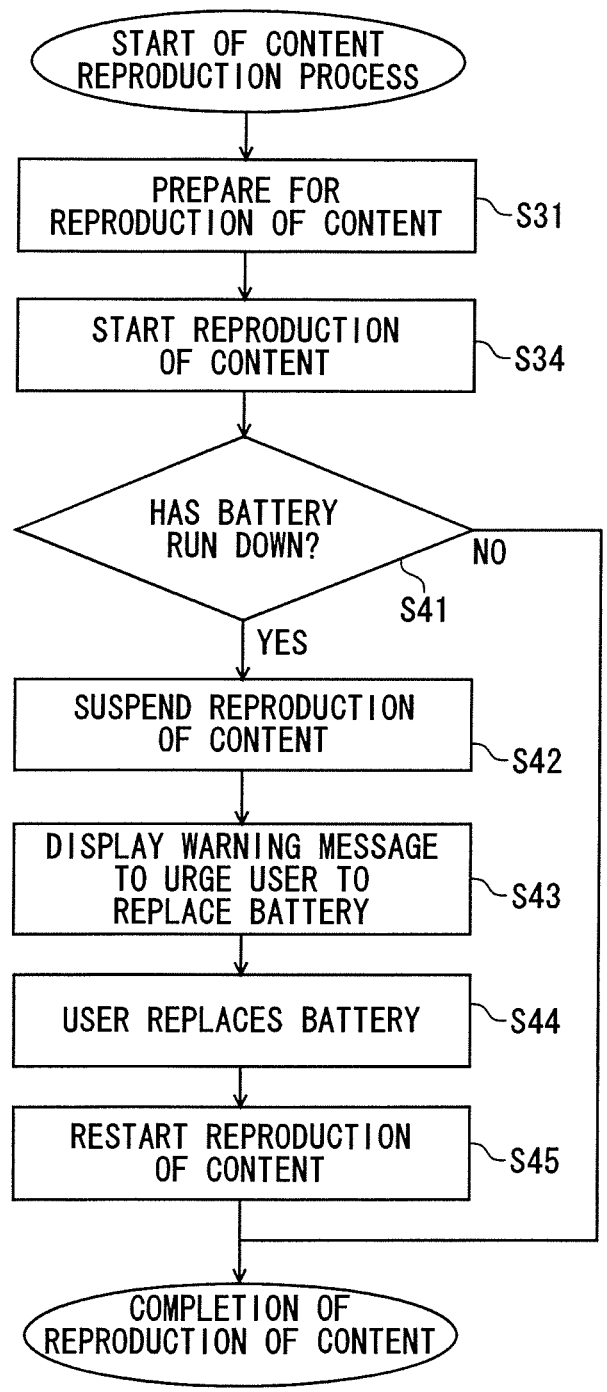
FIG. 4 is an exemplary flowchart showing a process of suspending a reproduction of a 3D video according to the embodiment.

FIG. 4 is a flowchart of a process which is executed when the 3D glasses 12 are rendered unusable because of running-down of their battery during reproduction of a recorded video stream. When the battery of the 3D glasses 12 has run down (S41: yes), at step S42 the reproduction of the video content is suspended. At step S43, a warning message is displayed on the screen to urge the user of the 3D video reproduction system to replace or charge the battery. In response, at step S44, the user replaces or charges the battery of the 3D glasses 12. If the user confirms replacement or charging of the battery or attachment of a new battery or the recharged battery is detected automatically, at step S45 the reproduction of the video stream is restarted.

Figure 5:
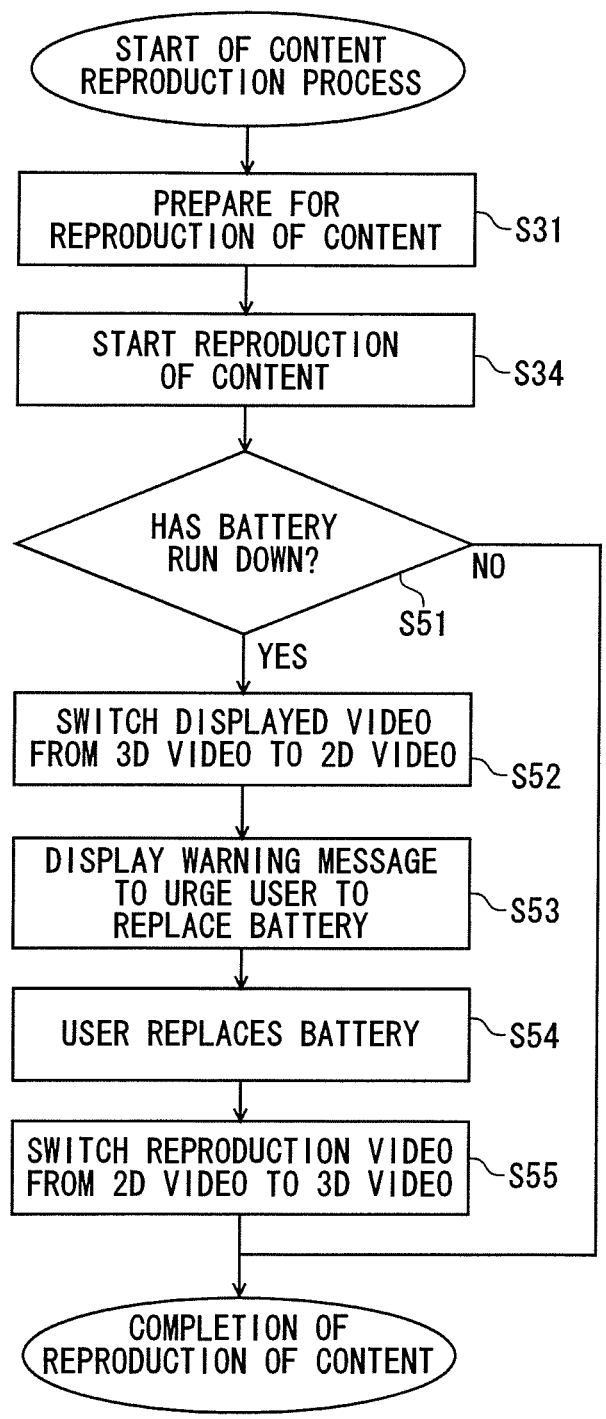
FIG. 5 is an exemplary flowchart showing a process of switching of 3D display/2D display according to the embodiment.

FIG. 5 is a flowchart of a process in which switching is made from 3D display to 2D display if the 3D glasses 12 are rendered unusable because of running-down of their battery during reproduction of a recorded video stream. When the battery of the 3D glasses 12 has run down (S51: yes), at step S52 switching is made from the current 3D display of the video stream to 2D display by supplying a switching signal from the control module 33 to the video output module 28. At step S53, a warning message is displayed on the screen to urge the user of the 3D video reproduction system to replace or charge the battery. The manner of display of a warning message is not restricted; a warning message may be superimposed on the 2D video stream or displayed in a window. In response, at step S54, the user replaces or charges the battery of the 3D glasses 12. If the user confirms replacement or charging of the battery or attachment of a new battery or the recharged battery is detected automatically, at step S55 switching is made from the 2D display to 3D display automatically by supplying a switching signal from the control module 33 to the video output module 28.

Figure 6:
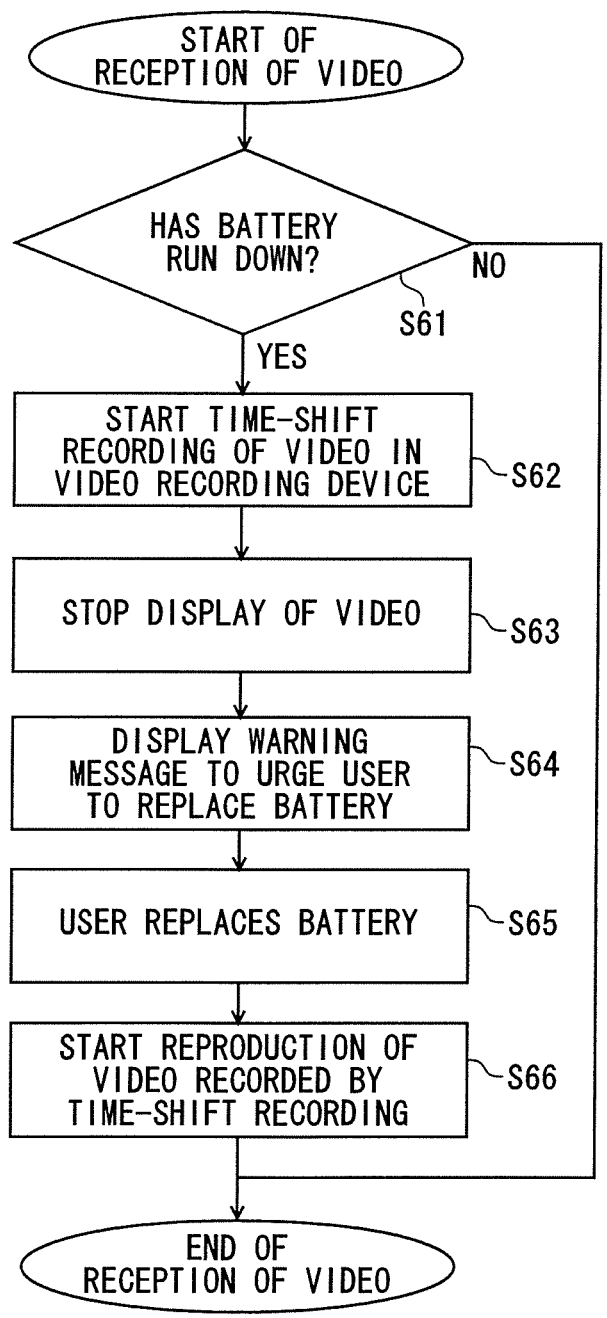
FIG. 6 is an exemplary flowchart showing a process of time-shift recording according to the embodiment.

FIG. 6 is a flowchart of a process in which time-shift recording is performed on video being viewed if the 3D glasses 12 are rendered unusable because of running-down of their battery during the viewing of the video of broadcast waves or the like. When the battery of the 3D glasses 12 has run down (S61: yes), at step S62 video being viewed starts to be recorded in the video recording device 34 (time-shift recording).

At step S63, the video display that is based on received broadcast waves or the like is stopped. At step S64, a warning message is displayed on the screen to urge the user of the 3D video reproduction system to replace or charge the battery. In response, at step S65, the user replaces or charges the battery of the 3D glasses 12. If the user confirms replacement or charging of the battery or attachment of a new battery or the recharged battery is detected automatically, at step S66 the signal of the output video is switched automatically to a reproduction video signal of the time-shift-recorded content.

In FIGS. 4, 5, 6, at step 41, 51 or 61, it is determined whether the battery of the 3D glasses 12 has run down (i.e., the remaining battery energy of 3D glasses is zero; however, the process may proceeds to step 42, 52 or 62 when it is determined that value of the remaining battery energy of 3D glasses is lower than a certain value.

Advantages of the first embodiment are as follows:

(1) An event that viewing of a content is suspended because of running-out of the battery of the 3D glasses 12 can be prevent by checking a battery usable time of the 3D glasses 12 before reproduction of the content.

(2) If the battery of 3D glasses runs down during reproduction of a 3D content, usually the 3D glasses stop its operation with the reproduction of the 3D content continued. In this case, it is usually necessary to return the reproduction position to a position where the 3D glasses ran down. In contrast, according to the first embodiment, when the battery of the 3D glasses 12 is made usable again, the reproduction can be restarted automatically from a position where the 3D glasses 12 ran down.

(3) If the battery of 3D glasses runs down during reproduction of a 3D content, usually the 3D glasses stop its operation with the reproduction of the 3D content continued. In this case, it is usually necessary to return the reproduction position to a position where the 3D glasses ran down. In contrast, according to the first embodiment, switching is made to 2D video and the 2D video can be viewed without using the 3D glasses 12 during battery replacement work. The display of the 3D content can be restarted automatically as soon as the battery of the 3D glasses 12 is made usable again.

(4) If the battery of 3D glasses runs down during viewing of a 3D broadcast, usually the 3D glasses stop its operation to cause the user to view the 3D broadcast without using the 3D glasses. In contrast, according to the first embodiment, time-shift recording is performed automatically during battery replacement work. When the battery of the 3D glasses 12 is made usable again, the viewing of the 3D broadcast can be restarted automatically from a position where the 3D glasses 12 ran down.

Second Embodiment

A second embodiment will be described below with reference to FIGS. 1 and 3-8. Components having the same ones in the first embodiment will not be described in detail.

Figure 7:
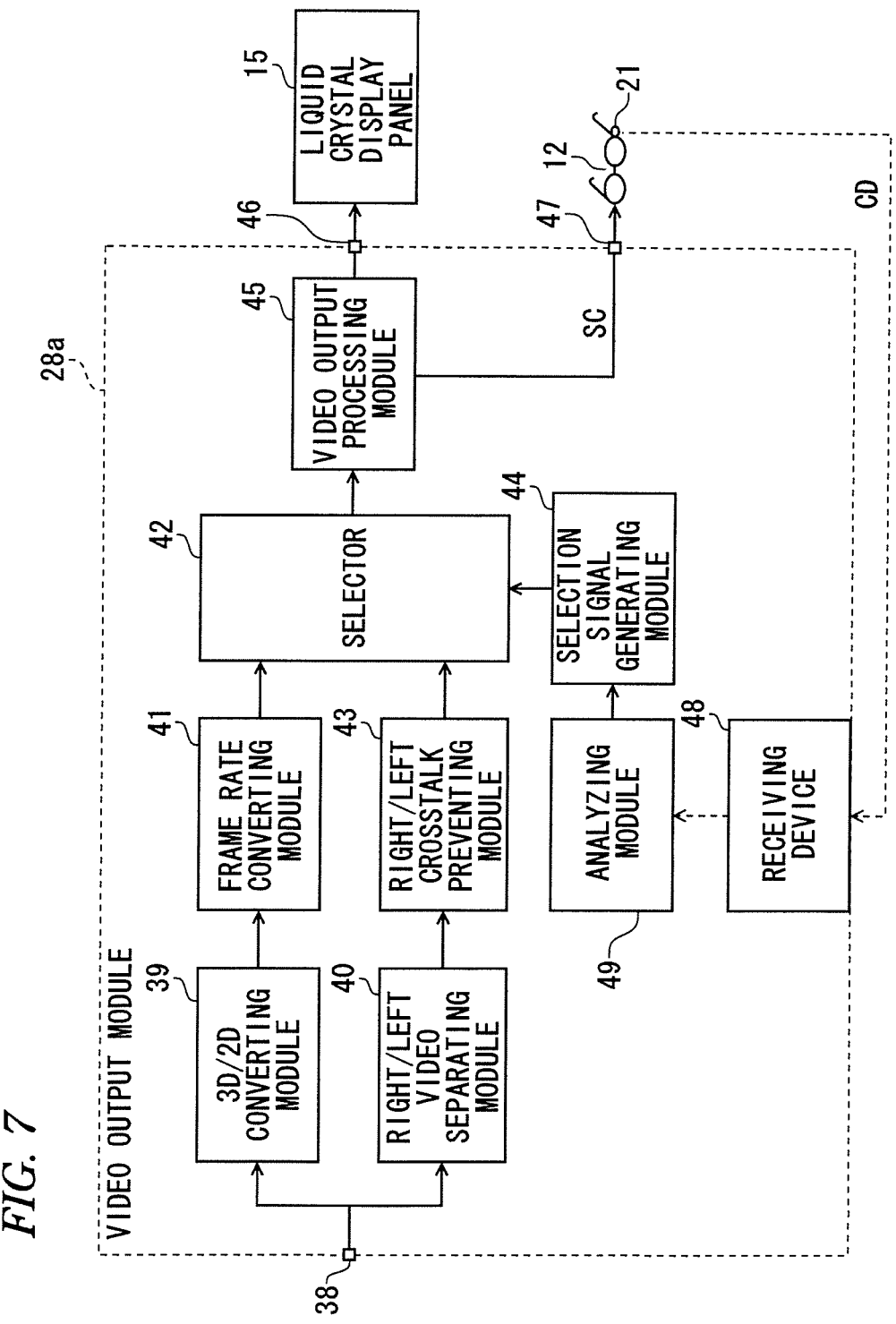
FIG. 7 is an exemplary block diagram explaining a video output module of a digital broadcast receiver according to another embodiment.

FIG. 7 is a block diagram showing the configuration of an example video output module 28a of a digital TV broadcast receiver. The video output module 28a is equipped with an analyzing module 49, which is useful in realizing the above-described advantages (1) and (3).

The battery energy detecting module 21 sends, by radio, a battery energy detection signal CD, which is received by the video output module 28a. If a video signal supplied from the video frame buffer 27 is 3D video signal and remaining battery energy indicated by the battery energy detection signal CD is normal, the video output module 28a generates a right-eye video signal and a left-eye video signal on the basis of the received video signal so that they are displayed alternately on the liquid crystal display panel 15 as 3D video.

If the battery energy detection signal CD indicates that the battery is not normal, the digital TV broadcast receiver 11 performs, for example, an operation of converting the received 3D video signal into an ordinary 2D video signal, performing frame rate doubling conversion on the ordinary 2D video signal to enable display on the liquid crystal display panel 15, and supplies a resulting video signal to the liquid crystal display panel 15. Two-dimensional video is thus displayed on the liquid crystal display panel 15.

A video signal that is supplied from the video frame buffer 27 is supplied to a 3D/2D converting module 39 and a right/left video separating module 40 via an input terminal 38.

If receiving an ordinary 2D video signal, the 3D/2D converting module 39 outputs the received 2D video signal to a frame rate converting module 41 as it is. If receiving a 3D video signal, the 3D/2D converting module 39 converts the received 3D video signal into an ordinary 2D video signal and outputs the latter to the frame rate converting module 41. The frame rate converting module 41 performs frame rate doubling conversion on the received ordinary 2D video signal to enable display on the liquid crystal display panel 15 by, for example, generating interpolation frames using inter-frame motion vectors, and outputs a resulting video signal to a first input terminal of a selector 42.

When receiving a 3D video signal, the right/left video separating module 40 separates it into a right-eye video signal and a left-eye video signal and outputs them to a right/left crosstalk preventing module 43 alternately at a double speed. The right/left crosstalk preventing module 43 performs processing for preventing crosstalk that would otherwise occur between the right-eye video signal and the left-eye video signal when switching is made between them (i.e., inserts a black frame between the frames of the alternately received right-eye video signal and left-eye video signal), and outputs a resulting video signal to a second input terminal of the selector 42.

More specifically, assume that as shown in FIG. 8A a 3D video signal R/L obtained by combining a right-eye video signal R and a left-eye video signal L is input to the input terminal 38 at a frame rate 60 Hz.

As shown in FIG. 8B, the right/left video separating module 40 separates the received video signal R/L into a right-eye video signal R and a left-eye video signal L and outputs them to the right/left crosstalk preventing module 43 at a double frame rate (120 Hz). As shown in FIG. 8C, the right/left crosstalk preventing module 43 inserts a black frame between the frames of the received right-eye video signal R and left-eye video signal L and outputs a resulting video signal to the second input terminal of the selector 42 at a quadruple frame rate (240 Hz).

On the other hand, as shown in FIG. 8D, the 3D/2D converting module 39 converts the received 3D video signal R/L (see FIG. 8A) into a 2D video signal having the same frame rate (60 Hz) and outputs it to the frame rate converting module 41. As shown in FIG. 8E, the frame rate converting module 41 performs, on the received 2D video signal, processing of increasing the frame rate to a quadruple frame rate (240 Hz) by frame interpolation or the like and outputs a resulting video signal to the first input terminal of the selector 42.

The selector 42 selects one of the video signals supplied from the frame rate converting module 41 and the right/left crosstalk preventing module 43 according to a selection signal that is output from a selection signal generating module 44 (described later), and outputs the selected video signal to a video output processing module 45. The video output processing module 45 performs, on the received video signal, prescribed signal processing to enable display on the liquid crystal display panel 15, and outputs a resulting video signal to the liquid crystal display panel 15 via an output terminal 46.

If receiving a 3D video signal, the video output processing module 45 generates a shutter control signal SC indicating right-eye video display periods and left-eye video display periods and outputs the generated shutter control signal SC to the 3D glasses 12 via an output terminal 47.

As a result, the 3D glasses 12 are controlled by the shutter control signal SC supplied from the video output processing module 45 so that the left-eye shutter is closed when the right-eye video is displayed and the right-eye shutter is closed when the left-eye video is displayed. The user can thus recognize 3D video.

A battery energy detection signal CD that is sent from the battery energy detecting module 21 of the 3D glasses 12 by radio is received by a receiving device 48 of the video output module 28a. The received battery energy detection signal CD is supplied to the analyzing module 49, which calculates a battery usable time or determines whether the battery has run down or not on the basis of, for example, remaining battery energy indicated by the battery energy detection signal CD. The function of calculating a battery usable time may be provided in the battery energy detecting module 21.

If determining that the battery has not run down yet, the analyzing module 49 causes the selection signal generating module 44 to generate a selection signal for switching the selector 42 so that it guides the output video signal of the right/left crosstalk preventing module 43 to the video signal processing module 45. If determining that the battery has run down, the analyzing module 49 causes the selection signal generating module 44 to generate a selection signal for switching the selector 42 so that it guides the output video signal of the frame rate converting module 41 to the video signal processing module 45.

With the above-described video output module 28a, if the battery runs down in a state that a 3D video signal is being used for video display on the liquid crystal display panel 15, a 2D video signal obtained by converting the 3D video signal automatically comes to be used for video display on the liquid crystal display panel 15. If the battery is not dead, the 3D video signal continues to be used for video display on the liquid crystal display panel 15 and the user can continue to recognize the 3D video.

That is, automatic switching is performed so that video display is performed using a 3D video signal if the battery is not dead and video display is performed using a 2D video signal if the battery is dead. As such, the 3D video reproduction system can be handled conveniently by the user and hence is suitable for putting into practical use.

Where a 3D video signal is used for video display on the liquid crystal display panel 15, a black frame is inserted between the frames of a right-eye video signal and a left-eye image signal that are separated from the 3D video signal, whereby crosstalk that would otherwise occur between the right-eye video signal and the left-eye video signal when switching is made between them is prevented. This is signal processing is specific to handling of a 3D video signal. The quality of a 3D video signal can thus be enhanced.

Where a 2D video signal obtained by conversion is used for video display on the liquid crystal display panel 15, frame rate doubling conversion is performed on the 2D video signal to enable display on the liquid crystal display panel 15. Therefore, the performance of the liquid crystal display panel 15 can be exploited sufficiently and even a 2D video signal can be enhanced in the quality of displayed video.

The embodiments disclose the following video systems which enable viewing of 3D video using 3D glasses which are driven by a battery.

(1) A video system characterized in that a usable time of the battery of the 3D glasses is compared with a video reproduction time before reproduction of 3D video and, if the former is determined shorter than the latter, a warning message relating to the battery usable time is displayed before reproduction of video.

(2) A video system characterized in that reproduction of 3D video is suspended automatically if the battery of the 3D glasses runs down during the reproduction and the reproduction is restarted automatically upon completion of replacement or charging of the battery.

(3) A video system characterized in that the reproduction video is switched automatically from 3D video to 2D video if the battery of the 3D glasses runs down during reproduction of the 3D video and the reproduction video is returned automatically from the 2D video to the 3D video upon completion of replacement or charging of the battery.

(4) A video system characterized in that 3D video, being viewed in realtime, of broadcast waves or the like is time-shift recorded automatically if the battery of the 3D glasses runs down during the viewing of the 3D video and the viewing of the 3D video is restarted automatically upon completion of replacement or charging of the battery.

The type of the video display device is irrelevant to the above items (1)-(4) as long as it is capable of 3D display. That is, the video display device may be a liquid crystal panel, a plasma panel, or a CRT display.

The invention is not limited to the above embodiments, and can be practiced so as to be modified in various manners without departing from the spirit and scope of the invention. For example, although the embodiments are directed to the digital TV broadcast receiver (may be one capable of storing contents), the invention can also be applied to apparatus (e.g., a Blu-ray apparatus and an HDD recorder) that are not equipped with a video display device but have a 3D display/3D output function.

While certain embodiments have been described, these embodiments have been presented by way of example only, and are not intended to limit the scope of the invention. Indeed, the novel apparatus and method described herein may be embodied in a variety of other forms; furthermore, various omissions, substitutions and changes in the form of the apparatus and method, described herein may be made without departing from the sprit of the invention. The accompanying claims and their equivalents are intended to cover such forms or modifications as would fall within the scope and sprit of the invention.

What is claimed is:

1. A video reproduction apparatus comprising:
   a processor configured to perform signal processing on a video signal including a plurality of videos, the processor comprises a first processor configured to perform signal processing for display of the plurality of videos on the video signal and a second processor configured to convert the video signal including the plurality of videos into a video signal including a single video and to perform signal processing for display of the single video on the converted video signal; and
   a controller configured to determine that a battery usable time of glasses for viewing the plurality of videos is shorter than a reproduction time of a content corresponding to the video signal, and to stop output of a video signal on which the signal processing has been performed by the processor and to display a warning message for replacement or charging of a battery of the glasses when determines that the battery usage time of the glasses is shorter than the reproduction time of the content corresponding to the video signal,
   wherein the controller further is configured to (i) restart output of the video signal on which the signal processing has been performed by the processor when determining that the battery has been replaced or charged after the display of the warning message and (ii) either stop output of the video signal on which the signal processing has been performed by the first processor, or output of the video signal on which the signal processing has been performed by the second processor instead of the video signal on which the signal processing has been performed by the first processor when a detection signal indicating that remaining battery energy of glasses for viewing the plurality of videos is low is received, and to perform the output of the video signal on which the signal processing has been performed by the first processor when a detection signal indicating that the remaining battery energy of the glasses is not low is received.

2. A video reproduction apparatus comprising:
   a processor configured to perform signal processing on a video signal including a plurality of videos, the processor comprises
      a first processor configured to perform signal processing for display of the plurality of videos on the video signal, and
      a second processor configured to convert the video signal including the plurality of videos into a video signal including a single video and to perform signal processing for display of the single video on the converted video signal; and
   a controller configured to (1) determine that a battery usable time of glasses for viewing the plurality of videos is shorter than a reproduction time of a content corresponding to the video signal, and to stop output of a video signal on which the signal processing has been performed by the processor and to display a warning message for replacement or charging of a battery of the glasses when determines that the battery usage time of the glasses is shorter than the reproduction time of the content corresponding to the video signal, and (2) perform either stop output of the video signal on which the signal processing has been performed by the first processor, or output of the video signal on which the signal processing has been performed by the second processor instead of the video signal on which the signal processing has been performed by the first processor when a detection signal indicating that remaining battery energy of glasses for viewing the plurality of videos is low is received, and to perform the output of the video signal on which the signal processing has been performed by the first processor when a detection signal indicating that the remaining battery energy of the glasses is not low is received.

3. The apparatus of claim 2, wherein the controller is configured to restart the output of the video signal on which the signal processing of the first processor has been performed upon determining that the battery has been replaced or charged after the suspension or switching.

4. The apparatus of claim 1, wherein the controller is configured to restart the output of the video signal on which the signal processing of the first processor has been performed upon determining that the battery has been replaced or charged after the suspension or switching.

* * * * *